(12) United States Patent
Lo et al.

(10) Patent No.: US 11,474,650 B1
(45) Date of Patent: Oct. 18, 2022

(54) FINGERPRINT RECOGNITION DEVICE AND FINGERPRINT RECOGNITION METHOD THEREOF

(71) Applicant: Image Match Design Inc., Zhubei (TW)

(72) Inventors: Yen-Kuo Lo, Zhubei (TW); Yeh-Suan Yan, Zhubei (TW)

(73) Assignee: IMAGE MATCH DESIGN INC., Zhubei (TW)

( * ) Notice: Subject to any disclaimer, the term of this patent is extended or adjusted under 35 U.S.C. 154(b) by 0 days.

(21) Appl. No.: 17/306,329

(22) Filed: May 3, 2021

(51) Int. Cl.
*G06F 3/041* (2006.01)
*G06F 3/044* (2006.01)
*G06F 1/08* (2006.01)
*G06F 3/0354* (2013.01)

(52) U.S. Cl.
CPC ............ *G06F 3/0443* (2019.05); *G06F 1/08* (2013.01); *G06F 3/03547* (2013.01); *G06F 3/0418* (2013.01)

(58) Field of Classification Search
CPC ...... G06F 1/08; G06F 3/03547; G06F 3/0418; G06F 3/0443
See application file for complete search history.

(56) References Cited

U.S. PATENT DOCUMENTS

| | | | | |
|---|---|---|---|---|
| 8,040,321 B2* | 10/2011 | Peng | ...................... | G06F 3/0445 345/169 |
| 8,159,462 B1* | 4/2012 | Seguine | .............. | G06F 3/04182 345/173 |
| 8,174,507 B2* | 5/2012 | XiaoPing | ............... | G06F 3/0445 200/600 |
| 8,717,302 B1* | 5/2014 | Qin | ........................ | G06F 3/0446 345/173 |
| 9,984,273 B2* | 5/2018 | Lo | ....................... | G01R 27/2605 |
| 10,650,214 B2* | 5/2020 | Yan | ........................ | H02J 7/0047 |
| 2003/0190061 A1* | 10/2003 | Chou | .................. | G06V 40/1306 382/124 |
| 2007/0229466 A1* | 10/2007 | Peng | .................... | G06F 3/04883 345/173 |
| 2007/0229470 A1* | 10/2007 | Snyder | ................... | G06F 3/0446 345/173 |
| 2007/0273659 A1* | 11/2007 | XiaoPing | ................ | G06F 3/045 345/173 |

(Continued)

*Primary Examiner* — Joe H Cheng
(74) *Attorney, Agent, or Firm* — Muncy, Geissler, Olds & Lowe, P.C.

(57) ABSTRACT

The fingerprint recognition device of the present invention includes: a substrate; a sensor located on the substrate and the sensor including a plurality of sensing finger touch pads around thereof; an oscillator, electrically connected to the plurality of sensing finger touch pads, and outputting at least one oscillating frequency signal; a timer outputting a clock signal to the oscillator; and a counting and digital comparator, counting and comparing the oscillating frequency signals. The fingerprint recognition method of the present invention includes: the oscillator receiving the clock signal and outputting the oscillation frequency signal; a finger touching the plurality of sensing finger touch pads; and counting and comparing the oscillation frequency signal and the oscillation frequency signal after the touch. The present invention is applied to the display surface of the electronic product, and detects whether the finger touches the fingerprint recognition device.

7 Claims, 5 Drawing Sheets

(56) References Cited

U.S. PATENT DOCUMENTS

| | | | | |
|---|---|---|---|---|
| 2007/0273660 A1* | 11/2007 | XiaoPing | ............... | G06F 3/0362 |
| | | | | 345/173 |
| 2008/0246723 A1* | 10/2008 | Baumbach | ............ | G06F 3/0443 |
| | | | | 345/156 |
| 2013/0154992 A1* | 6/2013 | Nascimento | ............ | G06F 3/044 |
| | | | | 345/174 |
| 2015/0130749 A1* | 5/2015 | Binstead | ............. | G06F 3/04164 |
| | | | | 345/174 |
| 2015/0153830 A1* | 6/2015 | Hirose | ..................... | G06F 3/016 |
| | | | | 345/173 |
| 2015/0199046 A1* | 7/2015 | Olson | ................... | G06F 3/0446 |
| | | | | 345/174 |
| 2015/0346253 A1* | 12/2015 | Wang | ................. | G06V 40/1353 |
| | | | | 324/662 |
| 2016/0004354 A1* | 1/2016 | Kremin | ................. | G06F 3/0446 |
| | | | | 345/174 |
| 2017/0235404 A1* | 8/2017 | Grivna | ................. | G06F 3/0443 |
| | | | | 345/174 |
| 2021/0004097 A1* | 1/2021 | Park | ................... | G06V 40/1306 |

* cited by examiner

```
┌─────────────────────────────────────────────────────────────────────────┐
│ Provide the fingerprint recognition device with a voltage source and calibrate it │
└─────────────────────────────────────────────────────────────────────────┘
                                        │
                                        ▼
        ┌──────────────────────────────────────────────────────────┐
        │ The oscillator receives the clock signal output by the timer and │
        │          outputs the oscillation frequency signal         │
        └──────────────────────────────────────────────────────────┘
                                        │
                                        ▼
        ┌──────────────────────────────────────────────────────────┐
        │ The finger touches the plurality of sensing finger touch pads to │
        │     generate the touch capacitance and affect the oscillation     │
        │                       frequency signal                    │
        └──────────────────────────────────────────────────────────┘
                                        │
                                        ▼
        ┌──────────────────────────────────────────────────────────┐
        │   The counting and digital comparator receives the oscillating   │
        │   frequency signal and the oscillating frequency signal after    │
        │            touch, and counts and compares them            │
        └──────────────────────────────────────────────────────────┘
```

FIG.4

FINGERPRINT RECOGNITION DEVICE AND FINGERPRINT RECOGNITION METHOD THEREOF

BACKGROUND OF THE INVENTION

Field of the Invention

The present invention relates to a fingerprint recognition field, in particular to a fingerprint recognition device and a fingerprint recognition method.

Description of the Prior Art

Biometric recognition technologies, such as fingerprint recognition, voiceprint recognition, and retinal recognition, have gradually matured and been widely used in personal identification and confirmation. Since fingerprint feature data requires less storage space than other types of biometric data, fingerprint recognition has become the mainstream in biometric technology. Therefore, many products on the market, such as notebook computers, tablet computers, mobile phones, etc., have integrated fingerprint recognition functions to improve the safety of use.

Since the conventional capacitive fingerprint recognition device needs to be equipped with an outer frame (such as an iron frame) to contact the user's finger to determine whether a touch event has occurred, if the fingerprint recognition device is to be attached to the display surface of an electronic product, this will reduce the visibility of the display surface, thus limiting the application of the fingerprint recognition device to a specific location of the electronic product, and the additional matching of the outer frame also increases the manufacturing cost of the fingerprint recognition device.

In view of the improvement of the above-mentioned prior art, the inventor provides a fingerprint recognition device and a fingerprint recognition method to solve the disadvantages of the conventional fingerprint recognition device.

SUMMARY OF THE INVENTION

The main purpose of the present invention is to provide a fingerprint recognition device, which is applied to the display surface of an electronic product without an additional frame.

Another object of the present invention is to provide a fingerprint recognition device, which does not require an additional frame, so that the manufacturing cost of the conventional fingerprint recognition device can be reduced.

Another object of the present invention is to provide a fingerprint recognition method of a fingerprint recognition device, which effectively senses whether a finger touches the fingerprint recognition device.

The present invention provides a fingerprint recognition device and a fingerprint recognition method thereof. The fingerprint recognition device of the present invention includes: a substrate; a sensor is located on the substrate, and the sensor has a plurality of sensing finger touch pads around thereof; an oscillator, is electrically connected to the plurality of sensing finger touch pads, and outputs at least one oscillatory frequency signal; a timer, outputs a clock signal to the oscillator; and a counting and digital comparator, receives the oscillatory frequency signal, and counts and compares the oscillating frequency signals to determine whether a finger touches the sensor.

In an embodiment of the fingerprint recognition device of the present invention, the plurality of sensing finger touch pads are arranged in the first to third rows of the outermost periphery of the sensor.

In an embodiment of the fingerprint recognition device of the present invention, the center of the sensor includes a plurality of finger image sensing pads.

In an embodiment of the fingerprint recognition device of the present invention, the sensor is further covered with a dielectric layer.

In an embodiment of the fingerprint recognition device of the present invention, the oscillator, the timer, and the counting and digital comparator are all installed in a chip.

In an embodiment of the fingerprint recognition device of the present invention, the finger touches the sensor, a touch capacitance is generated between the finger and the plurality of sensing finger touch pads, and the count and digital comparator detects the number decreased of oscillations of the oscillating frequency signal within a predetermined time, that is the frequency decreased of the oscillating frequency signal.

In an embodiment of the fingerprint recognition method of the fingerprint recognition device of the present invention, the steps include: providing the fingerprint recognition device with a voltage source and then calibrating; the oscillator receives the clock signal output by the timer and outputs the oscillation frequency signal; a finger touching the plurality of sensing finger touch pads to generate a touch capacitance and affecting the oscillation frequency signal; and the counting and digital comparator receiving the oscillation frequency signal and the oscillation frequency signal after the touch, and counting and comparing them.

In an embodiment of the fingerprint recognition method of the pattern recognition device of the present invention, wherein the counting and digital comparator detects the number decreased of oscillations of the oscillation frequency signal after a touch within a predetermined time, that is the frequency decreased of the oscillation frequency signal.

In an embodiment of the fingerprint recognition method of the pattern recognition device of the present invention, wherein the number of oscillations within the predetermined time is decreased or the frequency of the oscillation frequency signal is decreased to a predetermined value, that means the finger touching the plurality of sensing finger touch pads is a valid touch event.

BRIEF DESCRIPTION OF THE DRAWINGS

FIG. 4 is a flowchart of an embodiment of a fingerprint recognition method of the pattern recognition device of the present invention.

DETAILED DESCRIPTION OF THE PREFERRED EMBODIMENTS

Figure 1:
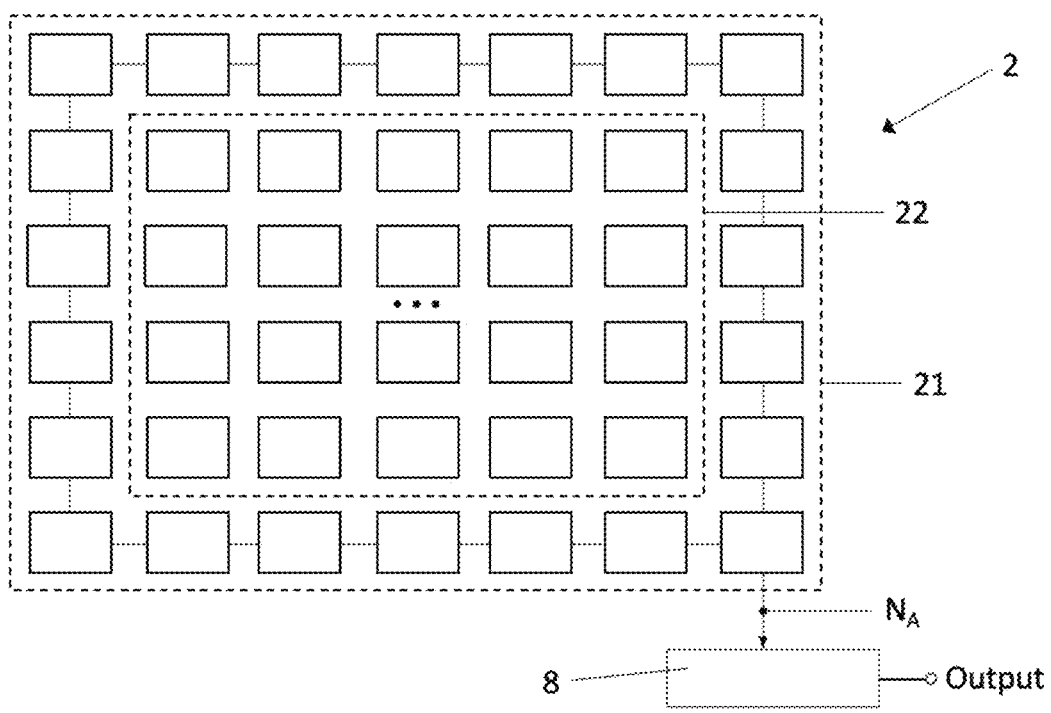
FIG. 1 is a schematic top view of an embodiment of the fingerprint recognition device of the present invention.
Figure 2:
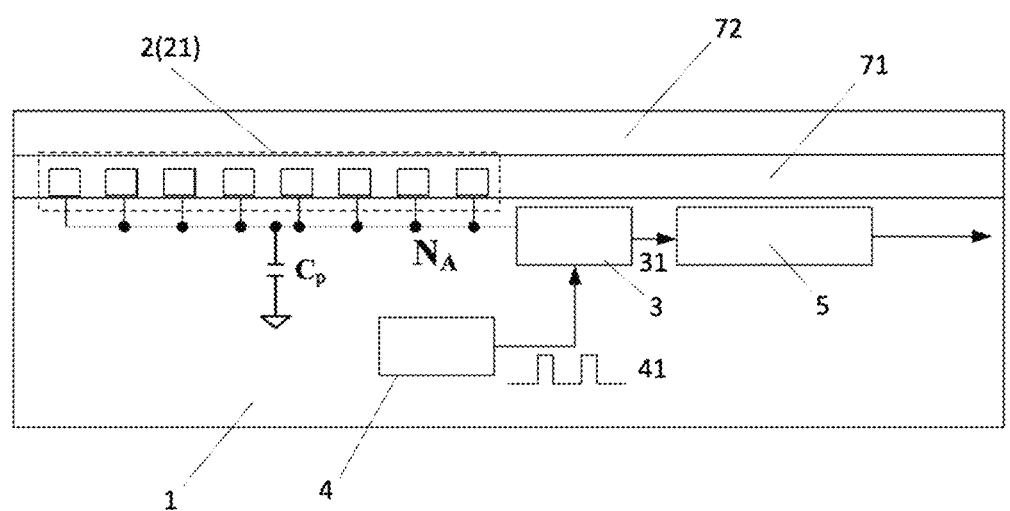
FIG. 2 is a schematic side view of an embodiment of the fingerprint recognition device of the present invention.
Figure 3:
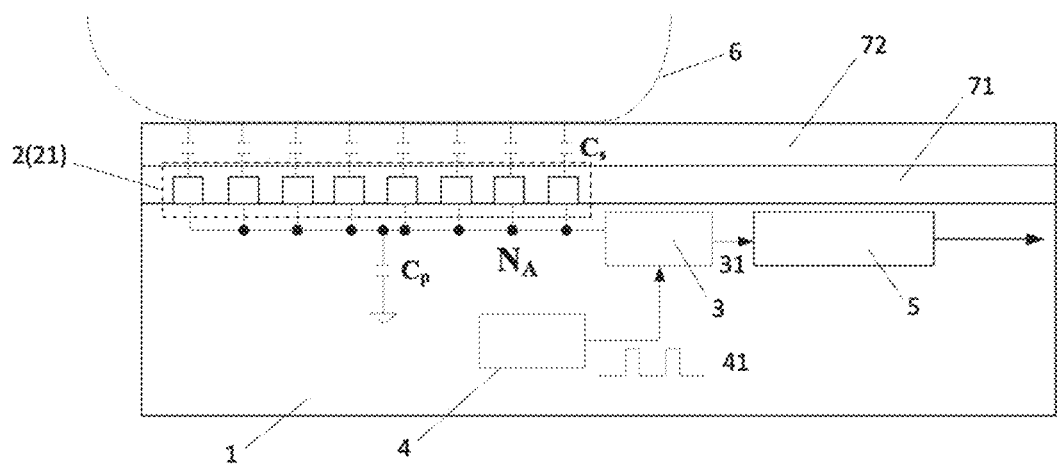
FIG. 3 is a schematic side view of an embodiment of the fingerprint recognition device of the present invention when a finger touches the fingerprint recognition device.

Please refer to FIGS. 1 to 3, a fingerprint recognition device according to an embodiment of the present invention includes: a substrate 1; a sensor 2 is located on the substrate 1, and the sensor 2 has a plurality of sensing finger touch pad 21 around thereof; an oscillator 3, electrically connects the plurality of sensing finger touch pads 21 by a plurality of nodes $N_A$, and outputs at least one oscillation frequency signal 31; a timer 4, outputs a clock signal 41 to the oscillator 3; and a counting and digital comparator 5, receives the oscillating frequency signals 31, and counts and compares the oscillating frequency signals 31, thereby determines whether a finger 6 touches the sensor 2.

The sensor 2 of the fingerprint recognition device is further covered with a dielectric layer 71 and the other dielectric layer 72. The dielectric layer 71 represents a dielectric material that encapsulates and the sensing finger touch pads 21, and the electrical layer 72 is a dielectric material used to contact the finger to be tested, such as glass. Since the substrate 1, the sensor 2 and the dielectric layers 71, 72 are all composed of transparent materials, the fingerprint recognition device is installed on the display surface (not shown) of an electronic product in this embodiment, but it is not limited to this. The fingerprint recognition device is also installed on other parts of the electronic product.

The plurality of sensing finger touch pads 21 are arranged in the first to third rows of the outermost periphery of the sensor 2. In this embodiment, the plurality of sensing finger touch pads 21 are arranged in the first row of the outermost periphery of the sensor 2, and the center of the sensor 2 includes a plurality of finger image sensing pads 22 for sensing a finger image, when the finger image is confirmed as the finger image of the user to unlock the display device.

When the finger 6 does not touch the plurality of sensing finger touch pads 21, there is a pair of ground capacitance Cp between the plurality of sensing finger touch pads 21 and the substrate 1 (as shown in FIG. 2). When the finger 6 touches the plurality of sensing finger touch pads 21, a touch capacitance Cs (as shown in FIG. 3) is generated between the finger 6 and the plurality of sensing finger touch pads 21, and the counting and digital comparator 5 detects the number decreased of oscillations of the oscillating frequency signal 31 after being touched within a predetermined time, that is the frequency decreased of the oscillating frequency signal 31.

In addition, the oscillator 3, the timer 4, and the counting and digital comparator 5 are all installed in a chip 8. The chip 8 is an integrated chip for fingerprint recognition and touch control, but is not limited to this.

Figure 5:
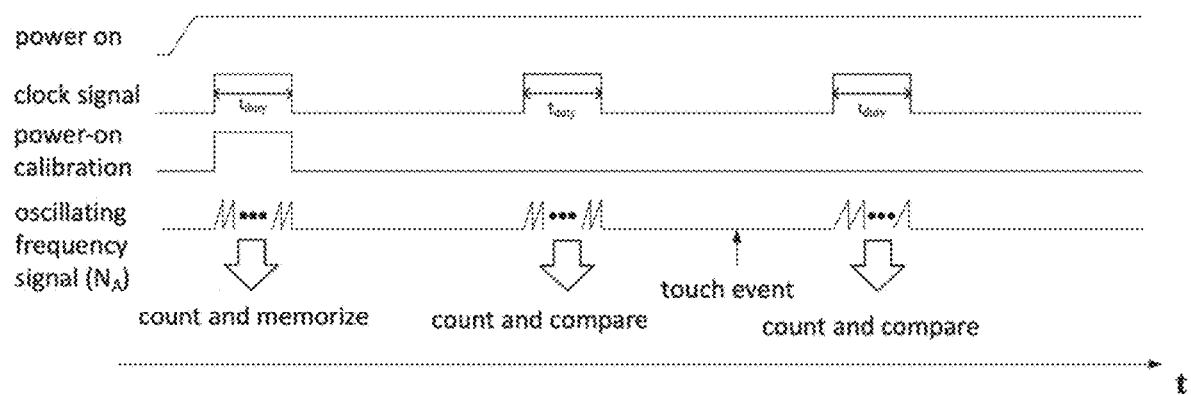
FIG. 5 is a diagram of various signal waveforms of an embodiment of the pattern recognition device and fingerprint recognition method of the present invention.

Please refer to FIG. 4 and FIG. 5 again, the fingerprint recognition method of the fingerprint recognition device according to an embodiment of the present invention, the steps include:

Step 1: Provide the fingerprint recognition device with a voltage source and calibrate it (please see the turn-on voltage and calibration signal in FIG. 5);

Step 2: The oscillator 3 receives the clock signal (the clock signal in FIG. 5) output by the timer 4 and outputs the oscillating frequency signal (the oscillating frequency signal in FIG. 5);

Step 3: The finger 6 touches the plurality of sensing finger touch pads 21 to generate the touch capacitance Cs and affect the oscillation frequency signal 31; and Step 4: The counting and digital comparator 5 receives the oscillation frequency signal 31 (the oscillation frequency signal before the touch event in FIG. 5) and the oscillation frequency signal 31 after the touch (the oscillation frequency signal after the touch event in FIG. 5), and count, memorize and compare them.

The counting and digital comparator 5 detects the number decreased of oscillations of the oscillation frequency signal 31 after a touch within a predetermined time ($t_{duty}$ in FIG. 5), that is the frequency decreased of the oscillation frequency signal.

In addition, when the number of oscillations is decreased within the predetermined time or the frequency of the oscillation frequency signal is decreased to a predetermined value, it means that the finger touching the plurality of sensing finger touch pads is a valid touch event, and then the plurality of finger image sensing pads 22 in the center of the sensor 2 are activated to sense the user's finger image, it can avoid the user's accidental touch and save power.

In summary, the fingerprint recognition device and fingerprint recognition method of the present invention do not require an additional frame, it is applied to the display surface of electronic products, reduces the manufacturing cost of the fingerprint recognition device, and effectively senses whether the finger touches the fingerprint recognition device.

Although the present invention is disclosed in the above embodiments, it is not intended to limit the present invention. Anyone with ordinary knowledge in the technical field makes some changes and touches without departing from the spirit and scope of the present invention. Therefore, the scope of protection of the present invention shall be subject to the scope of the claims.

What is claimed is:

1. A fingerprint recognition device, comprising:
   a substrate;
   a sensor, located on the substrate and including a plurality of sensing finger touch pads around thereof;
   an oscillator, electrically connected to the plurality of sensing finger touch pads, and outputting at least one oscillating frequency signal;
   a timer, outputting a clock signal to the oscillator; and
   a counting and digital comparator, receiving the oscillating frequency signals, and counting and comparing the oscillating frequency signals to determine whether a finger touches the sensor;
   wherein the plurality of sensing finger touch pads are arranged in the first to third rows of the outermost periphery of the sensor.

2. The fingerprint recognition device according to claim 1, wherein the center of the sensor includes a plurality of finger image sensing pads.

3. The fingerprint recognition device according to claim 1, wherein the sensor is further covered with a dielectric layer.

4. A fingerprint recognition method of the fingerprint recognition device according to claim 1, the steps of comprising:
   providing and calibrating the fingerprint recognition device after a voltage source;
   the oscillator receiving the clock signal output by the timer and outputting the oscillator frequency signal;
   a finger touching the plurality of sensing finger touch pads to generate a touch capacitance and affecting the oscillation frequency signal; and
   the counting and digital comparator receiving the oscillating frequency signal and the oscillating frequency signal after touch, and counting and comparing them.

5. A fingerprint recognition method according to claim 4, wherein the counting and digital comparator detect the number decreased of oscillations of the oscillation frequency signal after a touch within a predetermined time, that is the frequency decreased of the oscillation frequency signal.

6. A fingerprint recognition method according to claim 5, wherein the number of oscillations is decreased within the predetermined time or the frequency of the oscillation frequency signal is decreased to a predetermined value, that means the finger touching the plurality of sensing finger pads is a valid touch event.

7. A fingerprint recognition device, comprising:
- a substrate;
- a sensor, located on the substrate and including a plurality of sensing finger touch pads around thereof;
- an oscillator, electrically connected to the plurality of sensing finger touch pads, and outputting at least one oscillating frequency signal;
- a timer, outputting a clock signal to the oscillator; and
- a counting and digital comparator, receiving the oscillating frequency signals, and counting and comparing the oscillating frequency signals to determine whether a finger touches the sensor;
- wherein the finger touches the sensor, a touch capacitance is generated between the finger and the plurality of sensing finger touch pads, and the counting and digital comparator detects the number decreased of oscillations of the oscillating frequency signal within a predetermined time after the touch, that is the frequency decreased of the oscillating frequency signal.

* * * * *